(12) United States Patent
Chandra Sekar Rao et al.

(10) Patent No.: US 10,783,403 B2
(45) Date of Patent: Sep. 22, 2020

(54) AUTOMATED DESIGN TESTING THROUGH DEEP LEARNING

(71) Applicant: EMC IP HOLDING COMPANY LLC, Hopkinton, MA (US)

(72) Inventors: Venkata Chandra Sekar Rao, Bangalore (IN); Neeraj Kumar Tiwari, Bangalore (IN); Narayan Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 110 days.

(21) Appl. No.: 16/172,991

(22) Filed: Oct. 29, 2018

(65) Prior Publication Data
US 2020/0134381 A1    Apr. 30, 2020

(51) Int. Cl.
| | |
|---|---|
| G06K 9/62 | (2006.01) |
| G06N 3/08 | (2006.01) |
| G06K 9/46 | (2006.01) |
| G06F 40/40 | (2020.01) |

(52) U.S. Cl.
CPC ........... *G06K 9/6262* (2013.01); *G06F 40/40* (2020.01); *G06K 9/46* (2013.01); *G06K 9/6256* (2013.01); *G06N 3/08* (2013.01)

(58) Field of Classification Search
CPC ...... G06K 9/6262; G06K 9/46; G06K 9/6256; G06F 40/40; G06N 3/08
See application file for complete search history.

(56) References Cited

U.S. PATENT DOCUMENTS

| | | | | |
|---|---|---|---|---|
| 10,346,969 B1* | 7/2019 | Raghu | ................ | G01N 21/8851 |
| 2020/0019820 A1* | 1/2020 | Yoshida | ............... | G06K 9/6256 |

OTHER PUBLICATIONS

J. A. Calderon-martinez, An Application of Convolutional Neural Networks for Automatic Inspection, 2006 IEEE Conference on Cybernetics and Intelligent Systems, Bangkok, 2006, pp. 1-6. (Year: 2006).*

* cited by examiner

*Primary Examiner* — Brenda C Bernardi
(74) *Attorney, Agent, or Firm* — Krishnendu Gupta; Lesley Leonessa

(57) ABSTRACT

A method is used in evaluating a test subject in computing environments. A first machine learning system generates test subject features. A second machine learning system analyzes the test subject to detect distinguishing features of the test subject. A third machine learning system performs natural language processing on the test subject features to create evaluation information associated with the test subject. A test subject evaluation system provides an evaluation of the test subject based on the distinguishing features and the evaluation information.

20 Claims, 8 Drawing Sheets

AUTOMATED DESIGN TESTING THROUGH DEEP LEARNING

BACKGROUND

Technical Field

This application relates to automated design testing through deep learning in computing environments.

Description of Related Art

Manufacturers perform quality control on manufactured products to evaluate the quality and consistency of the manufactured products.

SUMMARY OF THE INVENTION

In accordance with one aspect of the invention is a method used in evaluating a test subject in computing environments. A first machine learning system generates test subject features. A second machine learning system analyzes the test subject to detect distinguishing features of the test subject. A third machine learning system performs natural language processing on the test subject features to create evaluation information associated with the test subject. A test subject evaluation system provides an evaluation of the test subject based on the distinguishing features and the evaluation information.

In accordance with one aspect of the invention is a system used in evaluating a test subject in computing environments. A first machine learning system generates test subject features. A second machine learning system analyzes the test subject to detect distinguishing features of the test subject. A third machine learning system performs natural language processing on the test subject features to create evaluation information associated with the test subject. A test subject evaluation system provides an evaluation of the test subject based on the distinguishing features and the evaluation information.

In accordance with another aspect of the invention, a computer program product comprising a computer readable medium is encoded with computer executable program code. The code enables execution across one or more processors for evaluating a test subject in computing environments. A first machine learning system generates test subject features. A second machine learning system analyzes the test subject to detect distinguishing features of the test subject. A third machine learning system performs natural language processing on the test subject features to create evaluation information associated with the test subject. A test subject evaluation system provides an evaluation of the test subject based on the distinguishing features and the evaluation information.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
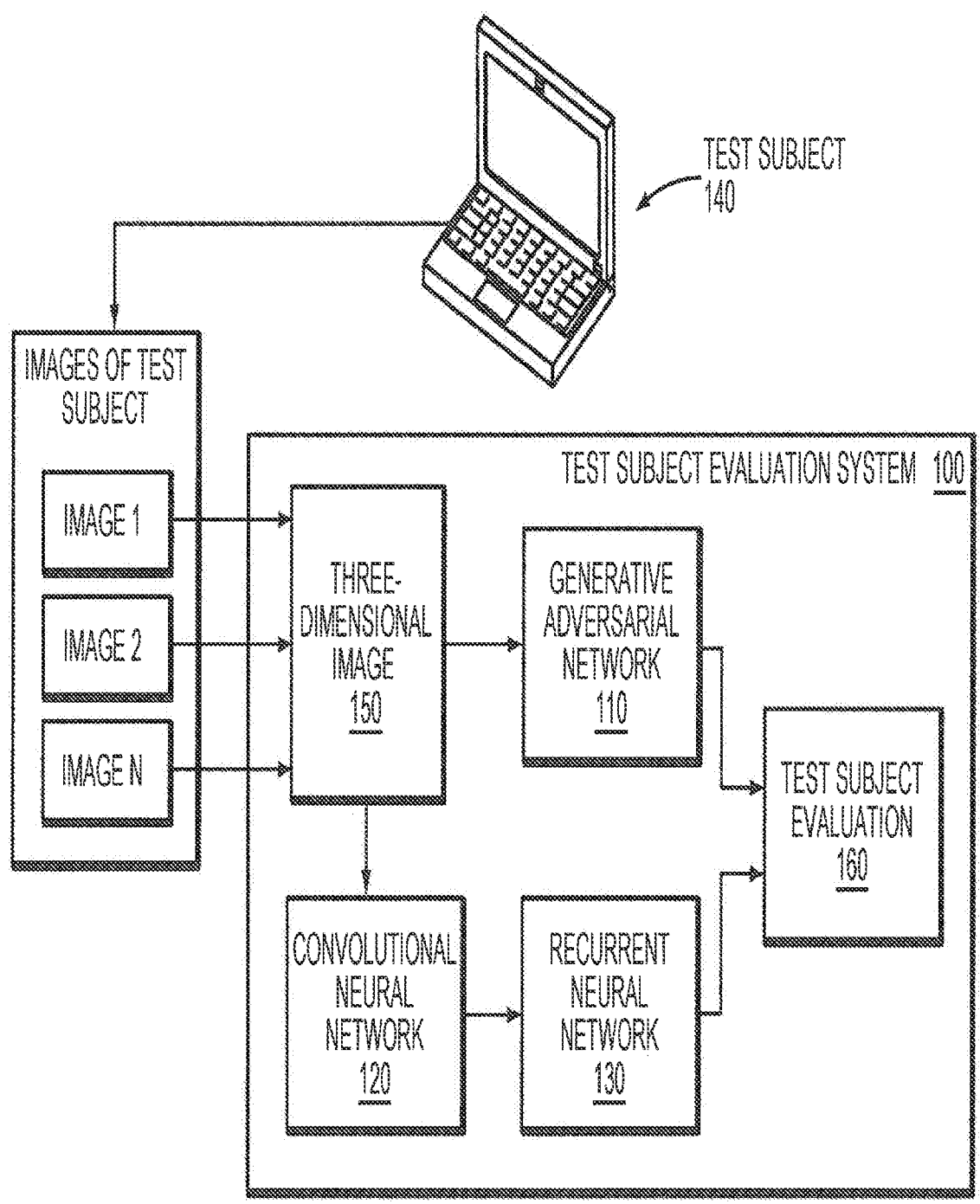
FIG. 1 illustrates an example embodiment of evaluating a test subject in computing environments, in accordance with an embodiment of the present disclosure.

Described below is a technique for use in evaluating a test subject in computing environments, which technique may be used to provide, among other things, generating, by a first machine learning system, test subject features, analyzing, by a second machine learning system, the test subject to detect distinguishing features of the test subject, performing, by a third machine learning system, natural language processing on the test subject features to create evaluation information associated with the test subject, and providing an evaluation of the test subject based on the distinguishing features and the evaluation information.

Manufacturers perform quality control inspections on manufactured products, inspecting the quality of materials, and detecting any defects that may be present, etc. Even though manufacturers may consistently purchase the raw materials from the same vendors, there may still be variations in the materials that are delivered. These variations must be detected during the inspection process to provide a consistent, quality product. When manufacturing, for example, laptop and/or desktop computers, the quality control inspections may be performed visually by a quality control technician. Manual testing and/or visual inspection is time consuming and relies on the skill and sharpness of the inspector.

Conventional technologies do not provide a technique for analyzing a test subject, for example, a laptop or desktop computer. Conventional technologies do not provide a technique for analyzing the dimensions of the test subject, dimensions of the components of the test subject, the quality of the materials, any defects, the color, etc. Conventional technologies do not provide techniques that extract all high level features (such as color, dimensions, etc.) and low level features (such as the distance between keys on a laptop keyboard, the distance from an edge of the test subject to a logo, the size of the logo, the placement of screws on the test subject, the depth to which the screws have been tightened into the test subject, etc.) of the test subject.

Conventional technologies do not generate a description of the visual assessment of the test subject during an inspection of the test subject. Conventional technologies do not apply machine learning systems to generate a natural text description of the visual assessment of test subject.

Conventional technologies do not automatically identify test subject features and any associated defects. Conventional technologies do not extract the features of the test subject from all angles simultaneously, such as color, shape, distance between test subject components, number of ports, etc. Conventional technologies do not apply machine learning systems to extract the test features far more efficiently than manually identifying the test subject features. Conventional technologies do not translate the identified test subject features into natural sentences through sequence generation techniques.

Conventional technologies do not automatically perform product inspections, such as identifying scratches, dents, etc., Conventional technologies do not use adversary based techniques to perform the product inspections.

Conventional technologies do not provide sufficient test cases to train quality control technicians how to perform the quality control inspections thoroughly and consistently from technician to technician.

Conventional technologies do not accelerate the inspection process of a test subject, while increasing the thoroughness of the inspection and the accuracy of the inspection. Conventional technologies cannot detect fraudulent and/or low quality materials, for example, by validating physical features such as shape, size, smoothness, scratches, dents, etc. Conventional technologies do not provide a description of the visual assessment to rate the vendors/manufacturers of the test subjects, raw materials, components of the test subjects, etc., and/or to provide feedback to the vendors that manufacture/provide the test subjects, raw materials, and/or components, etc., of the test subjects. Conventional technologies cannot avoid human based errors, such as test subject defects that go undetected by the human eye, for example, overlooking a color variation, inaccurate measurement of screw tightening/depth, surface scratches, etc.

By contrast, in at least some implementations in accordance with the current technique as described herein, a test subject evaluation system automatically generates a description of the visual assessment of a test subject during an inspection process of the test subject. A first machine learning system generates test subject features. A second machine learning system analyzes the test subject to detect distinguishing features of the test subject. A third machine learning system performs natural language processing on the test subject features to create evaluation information associated with the test subject. A test subject evaluation system provides an evaluation of the test subject based on the distinguishing features and the evaluation information.

Thus, one goal of embodiments disclosed herein is to reduce the time needed to complete the inspection process, and to increase the accuracy and thoroughness of the inspection process. Another goal of the embodiments disclosed herein is to detect fraudulent and/or low quality materials during the inspection process to rate and provide feedback to the providers of the materials and components of the test subjects. Yet another goal of embodiments disclosed herein is to detect any imperfections in the test subject prior to shipping to a customer, to maintain brand value through quality, and to reduce the replacement and/or return rate of test subjects that can reduce revenue of the companies that manufacture the test subjects.

In at least some implementations in accordance with the current technique described herein, the use of evaluating a test subject in computing environments can provide one or more of the following advantages: providing an automated, efficient, accurate inspection of test subjects, using deep learning to efficiently assess test subject features of the test subjects, automatically extracting high-level and low-level features of test subjects, efficiently automating detection of fraudulent and/or low quality materials, and improving customer satisfaction and maintain brand value.

In contrast to conventional technologies, in at least some implementations in accordance with the current technique as described herein, a first machine learning system generates test subject features. A second machine learning system analyzes the test subject to detect distinguishing features of the test subject. A third machine learning system performs natural language processing on the test subject features to create evaluation information associated with the test subject. A test subject evaluation system provides an evaluation of the test subject based on the distinguishing features and the evaluation information.

In an example embodiment of the current technique, the first machine learning system is a convolutional neural network trained using a plurality of images, where at least one of the plurality of images is translated into multiple representations of at least one of the plurality of images. The convolutional neural network is trained with the multiple representations.

In an example embodiment of the current technique, the test subject evaluation system receives a plurality of images of the test subject, where the plurality of images comprise a plurality of representations of the test subject. The test subject evaluation system creates a three-dimensional view of the plurality of images. The first machine learning system receives the three-dimensional view as input.

In an example embodiment of the current technique, the input to the second machine learning system is the three-dimensional view.

In an example embodiment of the current technique, the second machine learning system is a generative adversarial network that is trained using training images comprising normal and abnormal test subjects.

In an example embodiment of the current technique, the detected distinguishing features are anomalies present in the test subject.

In an example embodiment of the current technique, the second machine learning system outputs a result for the test subject of normal or abnormal.

In an example embodiment of the current technique, the input to the third machine learning system is the output of the first machine learning system.

In an example embodiment of the current technique, the third machine learning system is a recurrent neural network that is trained to interpret vector information provided as output by the first machine learning system.

FIG. 1 an example of an embodiment of a test subject evaluation system 100 in computing environments. In an example embodiment, multiple images of the test subject 140 are obtained. The images (i.e., Image 1, Image 2 . . . Image N) are taken of the test subject 140 from multiple angles. The multiple images are used to create a three-dimensional image 150 of the test subject 140. A first machine learning system, such as a convolutional neural network 120, generates test subject features. A second machine learning system, such as a generative adversarial network 110, analyzes the test subject to detect distinguishing features of the test subject such as normal or abnormal features. A third machine learning system, such as a recurrent neural network 130, performs natural language processing on the test subject features to create evaluation information, such as a test subject evaluation 160, associated with the test subject 140. The test subject evaluation system 100 provides an evaluation of the test subject 140 based on the distinguishing features and the evaluation information.

Figure 2:
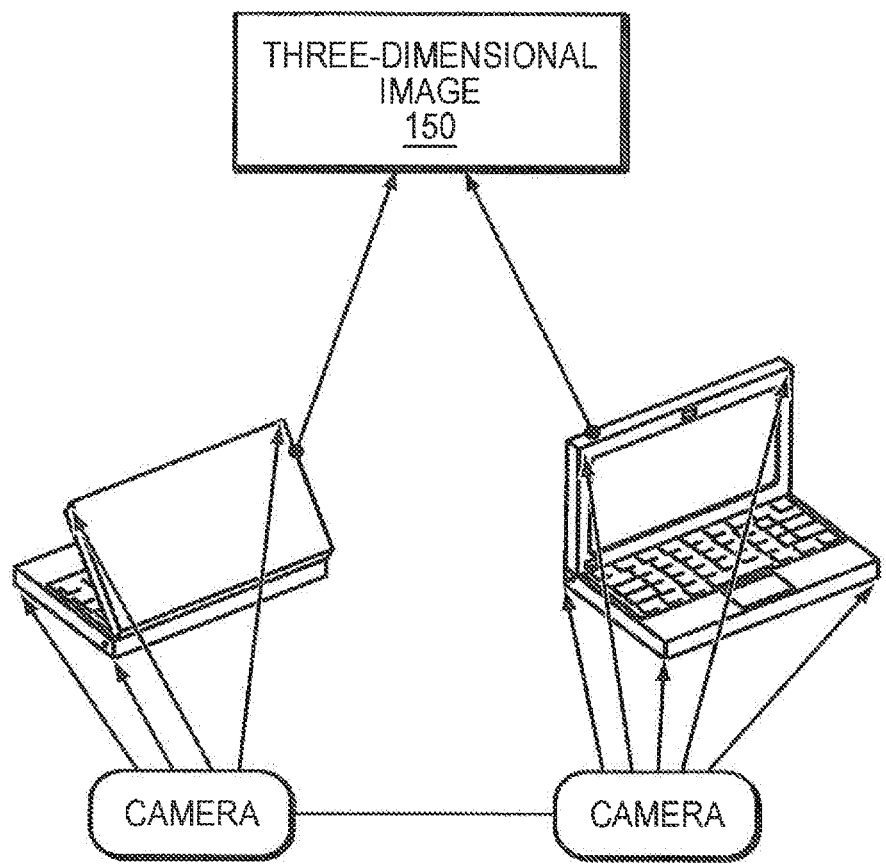
FIG. 2 illustrates an example embodiment of creating a three-dimensional image, in accordance with an example of the present disclosure.

FIG. 2 illustrates an example embodiment of creating the three-dimensional image 150, in accordance with an example of the present disclosure. In an example embodiment, images of the test subject 140 are captured from multiple angles. From these multiple angle images, a three-dimensional image 150 of the test subject 140 is created. In an example embodiment, any technique may be used to obtain the multiple images taken at many angles, and any technique may be used to create the three-dimensional image from the multiple images.

Figure 3:
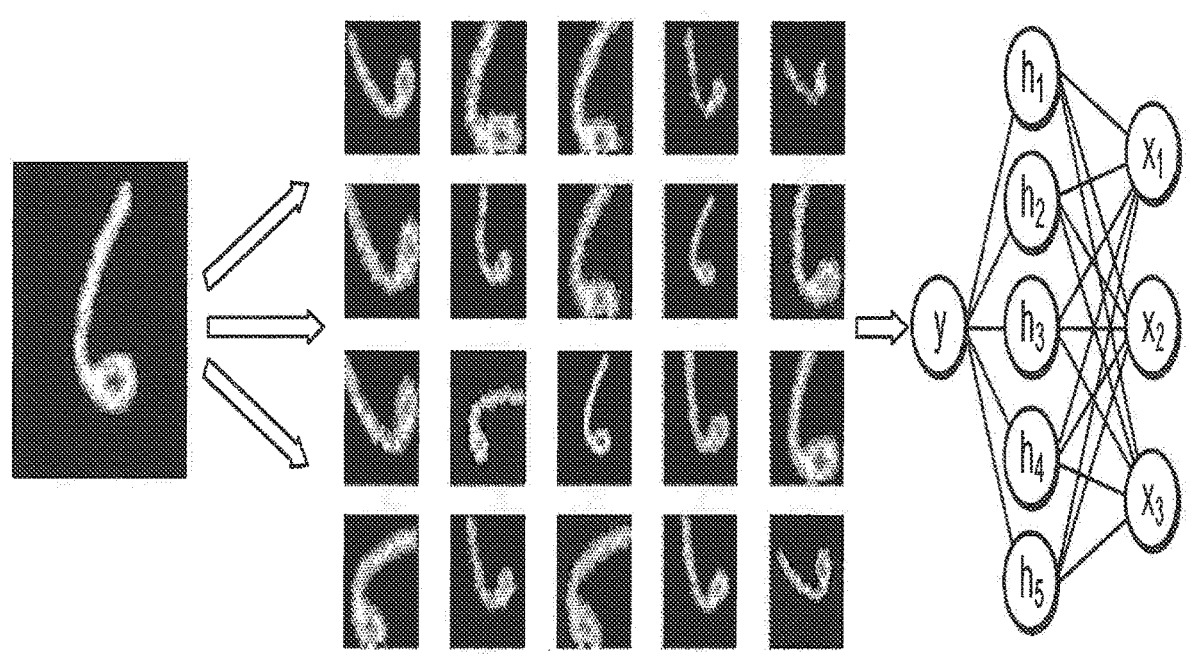
FIG. 3 illustrates an example embodiment of training the convolutional neural network, in accordance with an embodiment of the present disclosure.

FIG. 3 illustrates an example embodiment of training the convolutional neural network 120, in accordance with an embodiment of the present disclosure. In an example embodiment, the convolutional neural network 120 is trained by transforming at least one three-dimensional test image into a plurality of three-dimensional test images. Each of the plurality of three-dimensional test images represents the three-dimensional test image as a different representation. For example, each representation may be the three-dimensional test image flipped, rotated, scaled, cropped, translated, rendered with increased noise, etc.

The convolutional neural network 120 is trained to accept, as input, the multiple three-dimensional images, and to output a plurality of feature vectors that represent the features of the three-dimensional images. In an example embodiment, an algorithm is used to train the convolutional neural network 120 by passing features of, for example, an example test subject into the convolutional neural network 120, such as dimensions of the example test subject, etc. In an example embodiment, the algorithm detects features associated with the example test subject. During the training, the convolutional neural network 120 is trained to detect test subject features of the example test subject. For example, the algorithm may train the convolutional neural network 120 to detect test subject features such as color, dimensions, measurements, sharp edges, etc. In an example embodiment, the algorithm is customized to detect all the test subject features, whether they be high level features or low level features.

Figure 4:
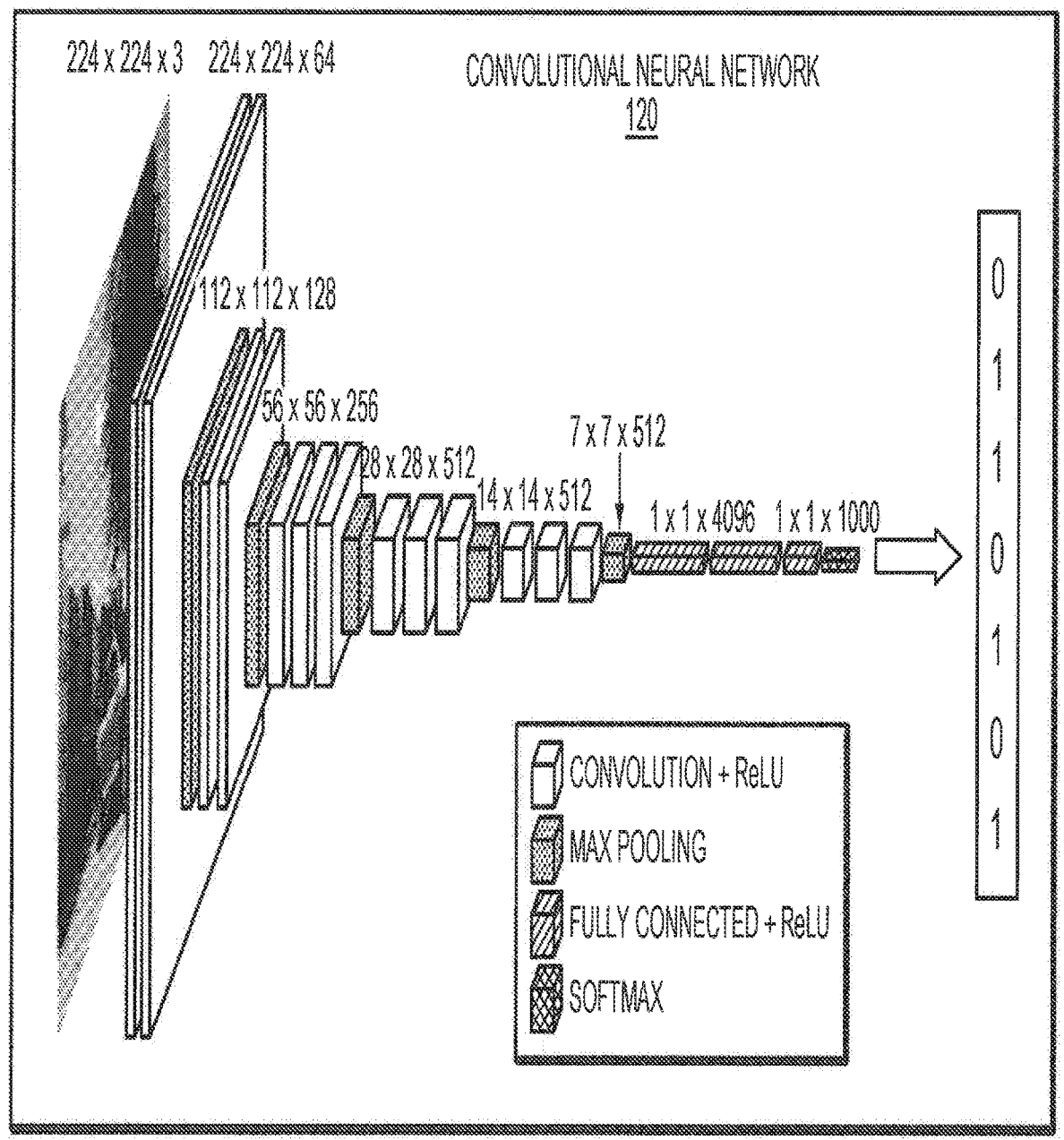
FIG. 4 illustrates an example embodiment of the convolutional neural network, in accordance with an embodiment of the present disclosure.

FIG. 4 illustrates an example embodiment of the convolutional neural network 120, in accordance with an embodiment of the present disclosure. The convolutional neural network 120 learns the test subject features of the test subject 140, and classifies the test subject features. In an example embodiment, the input to the convolutional neural network 120 is the three-dimensional image 150 generated by the test subject evaluation system 100. In an example embodiment, the output of the convolutional neural network 120 is a plurality of feature vectors that map the list of test subject features that the convolutional neural network 120 has detected in the test subject 140. In an example embodiment, there is a feature vector for each feature. For example, for the color feature vector, if the test subject 140 is "blue", then the color feature vector has a value of "1" for the color "blue", and a value of "0" for all the other colors in the color feature vector.

Figure 5:
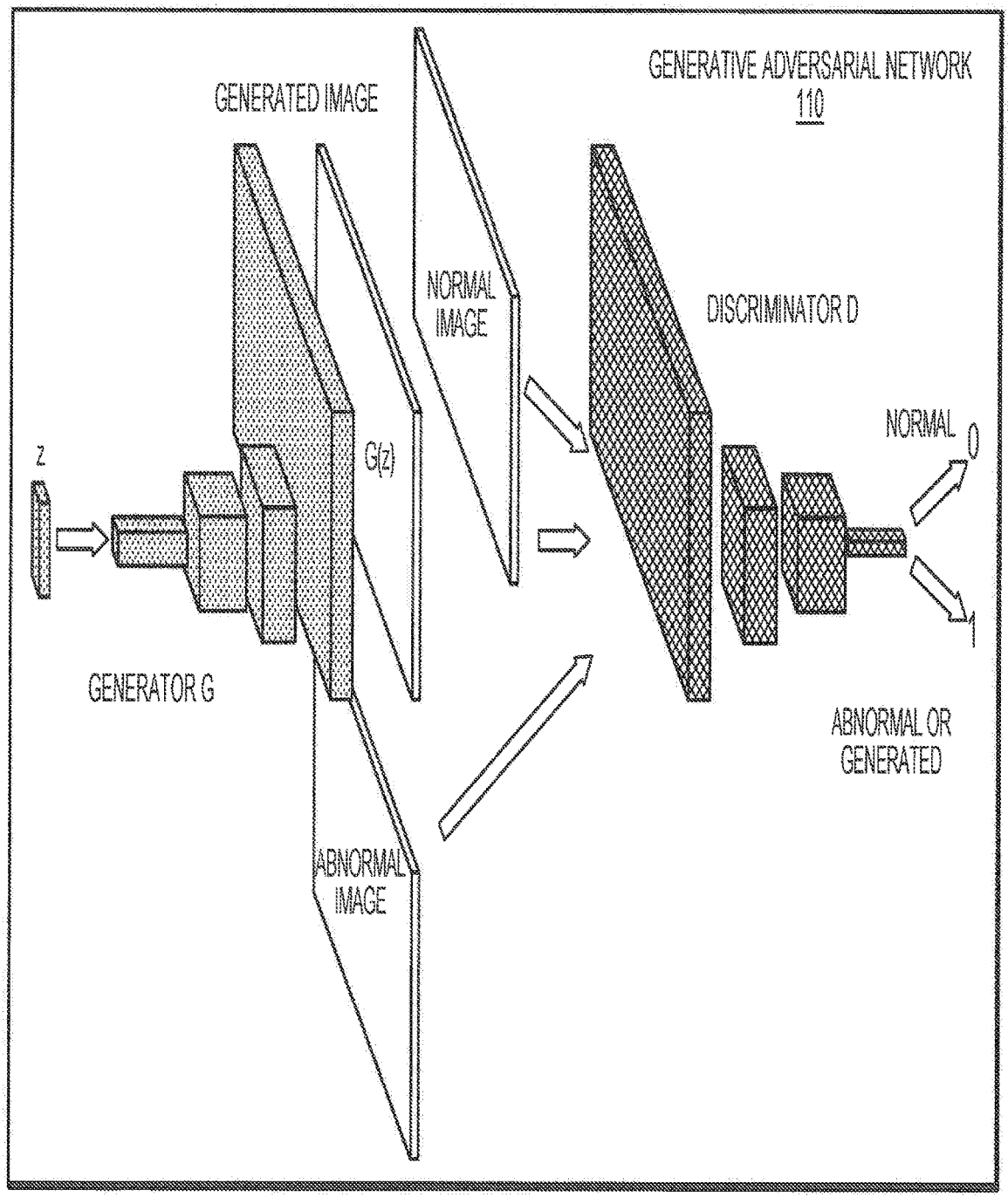
FIG. 5 illustrates an example embodiment of the generative adversarial network, in accordance with an embodiment of the present invention.

FIG. 5 illustrates an example embodiment of the generative adversarial network 110, in accordance with an embodiment of the present invention. In an example embodiment, the generative adversarial network 110 provides adversarial based product inspection to detect defects, such as dents, scratches, etc. The generative adversarial network 110 assesses whether the test subject 140 is "normal" or "abnormal". In an example embodiment, the generative adversarial network 110 is trained with a set of images that comprise a normal distribution of abnormal images, and a normal distribution of normal images. In an example embodiment, the three-dimensional image 150 (that represents the test subject 140) is provided as input to the generative adversarial network 110, and the output is a binary determination indicating that the test subject 140 is normal or abnormal.

Figure 6:
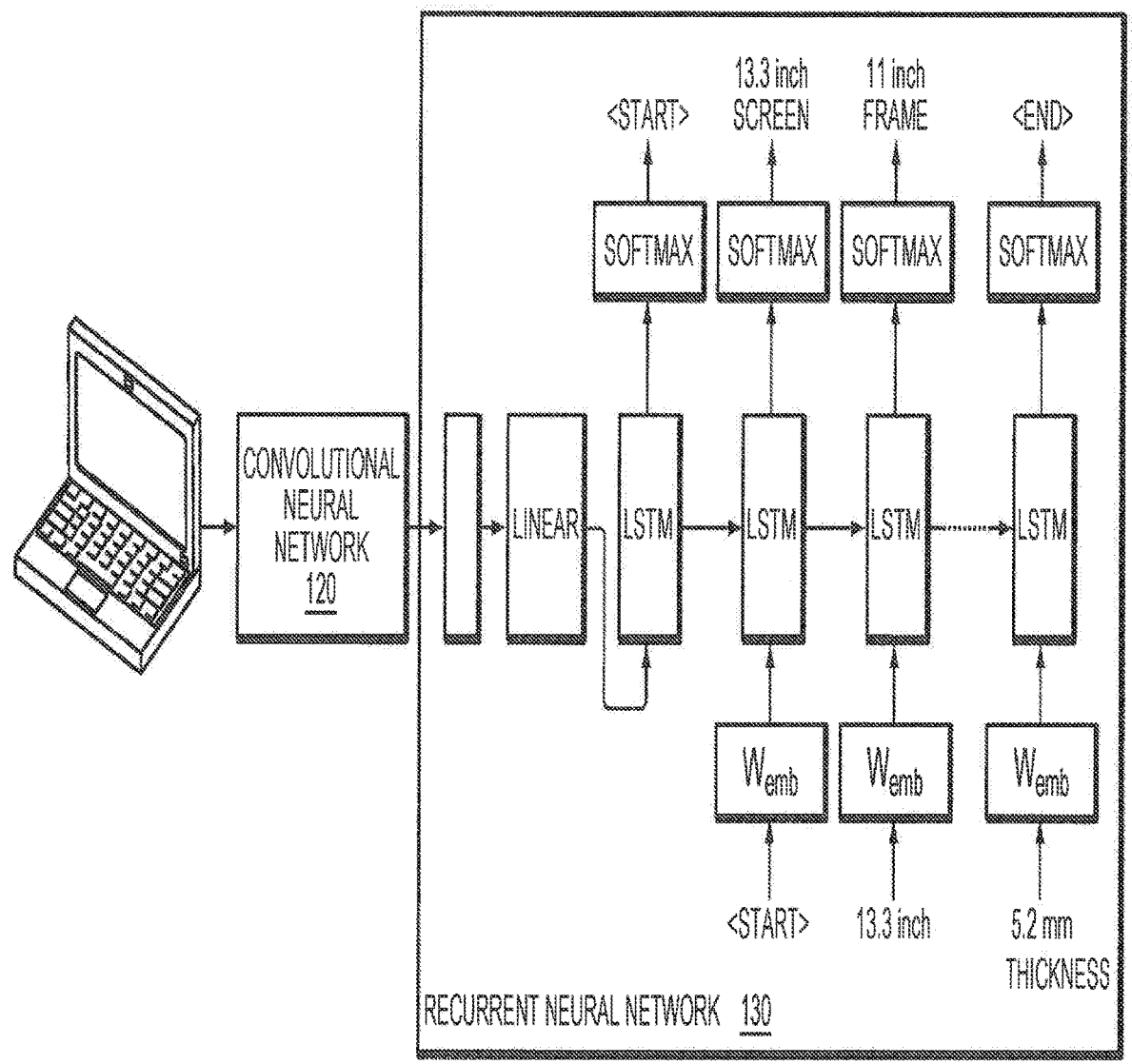
FIG. 6 illustrates an example embodiment of the recurrent neural network, in accordance with an embodiment of the present invention.

FIG. 6 illustrates an example embodiment of the recurrent neural network 130, in accordance with an embodiment of the present invention. The recurrent neural network 130 performs feature extraction and natural text generation using the three-dimensional image 150 as input. In an example embodiment, the recurrent neural network 130 is a language based model that translates the generated test subject features into natural sentences through sequence generation techniques. In an example embodiment, the input to the recurrent neural network 130 is the output of the convolutional neural network 120. The output of the recurrent neural network 130 is a description of the visual assessment that, for example, may be compared to a product specification to verify the test subject's compliance with the product specification. Thus, multiple images of the test subject 140 are taken from multiple angles. A three-dimensional image 150 is created from the multiple angle images. The three-dimensional image 150 is entered as input to the convolutional neural network 120, and the output of the convolutional neural network 120 (i.e., the plurality of vector features) is the input to the recurrent neural network 130. In an example embodiment, from the plurality of feature vectors, the recurrent neural network 130 determines whether the test subject 140 has, for example, scratches, dents, etc. In an example embodiment, the recurrent neural network 130 extracts the features from the plurality of feature vectors and generates natural text that describes the test subject 140, including normal features (i.e., dimensions, color, whether the color of the test subject 140 is accurate, etc.) and any abnormalities. For example, the recurrent neural network 130 provides information related to abnormalities, such a scratch; how deep the scratch is, where the scratch is located on the test subject 140 (i.e., how far from the edge of the test subject 140), etc. In an example embodiment, the recurrent neural network 130 may also provide information related to features that may or may not be an abnormality based on the specification associated with the test subject 140. For example, the distance between keys on a keyboard may be normal or abnormal based on a key distance specified in the test subject specification. In an example embodiment, the generative adversarial network 110 may be trained to detect superficial defects, whereas the recurrent neural network 130 may be trained to detect details (i.e., defects) that are not within a tolerance specified in the test subject specification. The recurrent neural network 130 may also be trained to identify test subject details that match the test subject specification.

Figure 7:
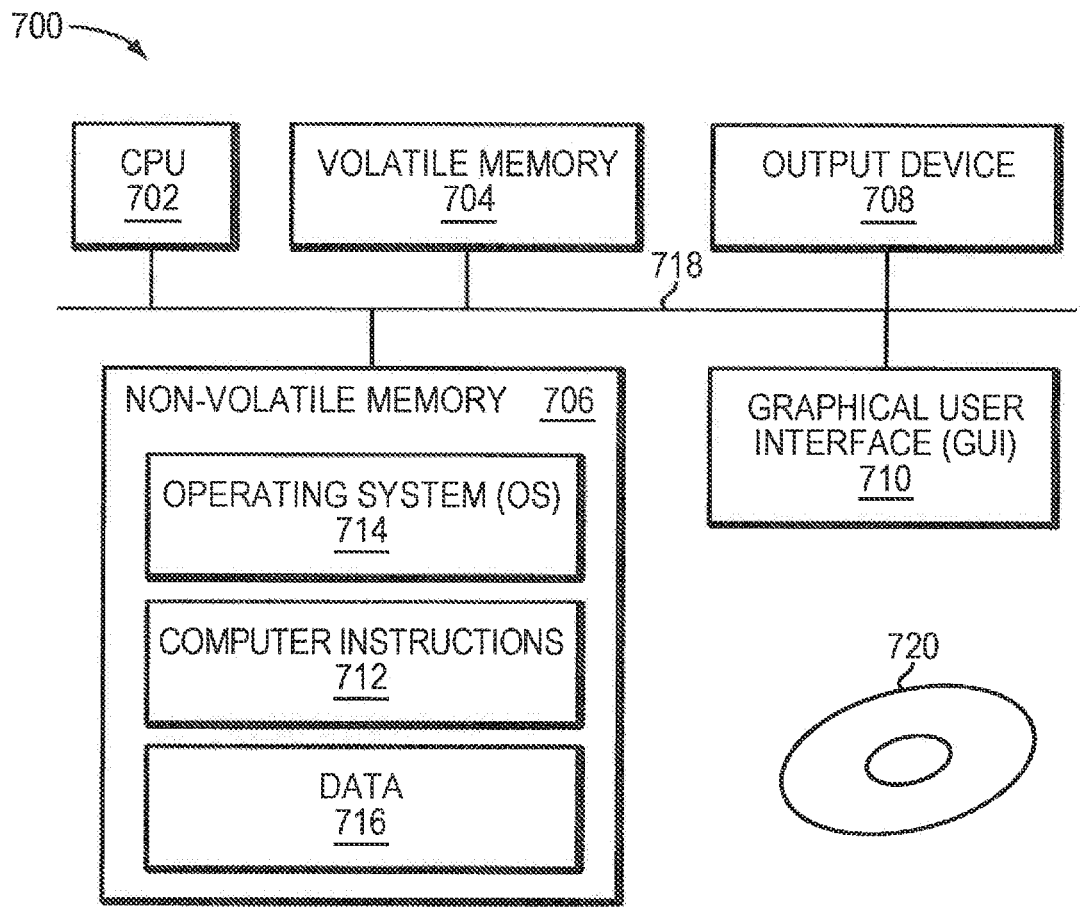
FIG. 7 is a block diagram of a computer, in accordance with an embodiment of the present disclosure.

FIG. 7 illustrates a block diagram of a computer 700 that can perform at least part of the processing described herein, according to one embodiment. The computer 700 may include a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 may be configured to store computer instructions 712, an operating system 714, and data 716. In one example, the computer instructions 712 are executed by the processor 702 out of volatile memory 704. In one embodiment, an article 720 comprises non-transitory computer-readable instructions. In some embodiments, the computer 700 corresponds to a virtual machine (VM). In other embodiments, the computer 700 corresponds to a physical computer.

Figure 8:
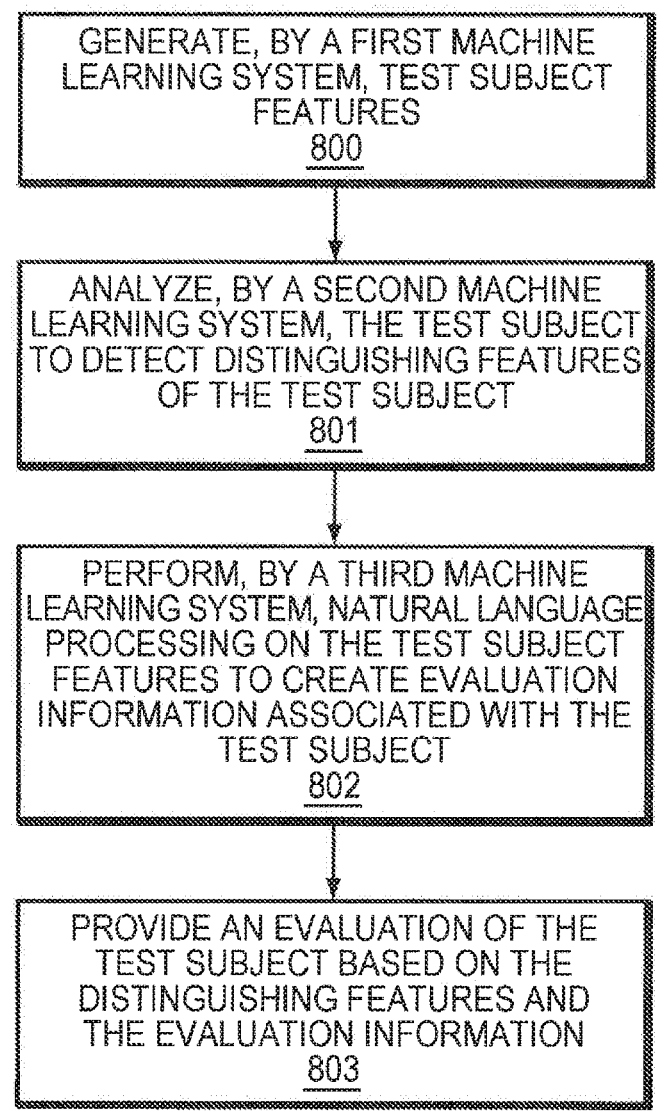
FIG. 8 is a flow diagram illustrating processes that may be used in connection with techniques disclosed herein.

Referring to FIG. 8, shown is a more detailed flow diagram illustrating evaluating a test subject in computing environments. With reference also to FIGS. 1-7, the first machine learning system generates test subject features (Step 800). In an example embodiment, the first machine learning system is a convolutional neural network 120, and is trained using a plurality of images. In an example embodiment, at least one of the plurality of images (i.e., a selected image) is translated into multiple representations of the selected image, where the convolutional neural network 120 is trained with the multiple representations as illustrated in FIG. 3. In an example embodiment, the test subject evaluation system 100 receives a plurality of images of the test subject, where the plurality of images comprise a plurality of representations of the test subject 140. The test subject evaluation system 100 creates a three-dimensional image 150, or three-dimensional view of the plurality of images.

The convolutional neural network 120 as illustrated in FIG. 4 extracts high level details, such as color, dimensions, etc., and low level details, such as patterns. For example, the patterns may include the distance between keys on a laptop keyboard, the distance from an edge of the test subject 140 to a logo, the size of the logo, the placement of screws on the test subject 140, the depth to which the screws have been tightened into the test subject 140, etc. The convolutional neural network 120 receives the three-dimensional view as input. The convolutional neural network 120 extracts the features of the test subject 140 from the three-dimensional image 150. The output of the convolutional neural network 120 is a plurality of feature vectors that represents the features of the test subject 140. In an example embodiment, the convolutional neural network 120 determines high level features, such as color, dimensions, locations of Universal Serial Bus (USB) ports, dimensions, etc. In an example embodiment, the convolutional neural network 120 determines low level features, such as the distance between keys on a keyboard of a laptop, the number of screws in a test subject 140, the size of logos on the test subject 140, the distance from a component of the test subject 140 to the edge of the test subject 140.

It should be noted that the test subject 140 may be, but is not limited to, any product that can be manufactured, but the test subject 140 may also be any item and/or living being that can be photographed. For example, the test subject 140 may be a person, and the test subject evaluation system 100 may be used to evaluate, for example, the person. For example, the test subject evaluation system 100 may be used to identify anomalies from an x-ray image, or evaluate the symmetry of human features, identify skin conditions, etc. In other words, the test subject evaluation system 100 may be used for any test subject for which an image may be provided.

In an example embodiment, the input to the second machine learning system is the three-dimensional view. In an example embodiment, the second machine learning system is a generative adversarial network, and is trained using training images comprising normal and abnormal test subjects The second machine learning system analyzes the test subject to detect distinguishing features of the test subject (Step 801). In an example embodiment, the detected distinguishing features are anomalies present in the test subject 140. In an example embodiment, the second machine learning system outputs a result for the test subject 140 of normal or abnormal. It can detect, for example, scratches, dents, inaccurate color, etc.

The third machine learning system performs a natural language processing on the test subject features to create evaluation information (i.e., a test subject 140) associated with the test subject (Step 802). In an example embodiment, the third machine learning system is a recurrent neural network 130, and is trained to interpret vector information (for example, the plurality of feature vectors) produced as output by the first machine learning system, and provided as input to the third machine learning system. In other words, the input to the third machine learning system is the output of the first machine learning system. The recurrent neural network 130 takes the test subject features generated by the convolutional neural network 120 in the form of the plurality of feature vectors, and outputs the test subject features as natural language, for example, "13.3 inch Screen", "11 inch Frame", "5.2 mm Thickness, etc.

The test subject evaluation system 100 provides an evaluation of the test subject 140 based on the distinguishing features and the evaluation information (Step 803). For example, a tester may compare the test subject evaluation 160 with a test subject specification that details what the test subject 140 should comprise. In an example embodiment, the description of the visual assessment of the test subject 140 may be, "With Black color, 15.3 inch screen, 11.1 inch frame, 4 USB ports, logo is a distance of 5 cm from the edge, small scratch on the left side with 1 m distance from the USB port".

There are several advantages to embodiments disclosed herein. For example, the method provides an automated, efficient, accurate inspection of test subjects. The method uses deep learning to efficiently assess test subject features of test subjects. The method automatically extracts high-level and low-level features of test subjects. The method efficiently automates detection of fraudulent and/or low quality materials. The method improves customer satisfaction and maintain brand value.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of evaluating a test subject, the method comprising:
   generating, by a first machine learning system, test subject features;
   analyzing, by a second machine learning system, the test subject to detect distinguishing features of the test subject;
   performing, by a third machine learning system, natural language processing on the test subject features to create evaluation information associated with the test subject; and
   providing an evaluation of the test subject based on the distinguishing features and the evaluation information.

2. The method of claim 1, wherein the first machine learning system is a Convolutional Neural Network, and wherein the Convolutional Neural Network is trained using a plurality of images, wherein at least one of the plurality of images is translated into multiple representations of the at least one of the plurality of images, wherein the Convolutional Neural Network is trained with the multiple representations.

3. The method of claim 1, wherein generating, by the first machine learning system, test subject features comprises:
   receiving a plurality of images of the test subject, wherein the plurality of images comprise a plurality of representations of the test subject;
   creating a three-dimensional view of the plurality of images; and
   receiving, by the first machine learning system, the three-dimensional view as input.

4. The method of claim 3, wherein the input to the second machine learning system is the three-dimensional view.

5. The method of claim 1, wherein the second machine learning system is a Generative Adversarial Network, and wherein the Generative Adversarial Network is trained using training images comprising normal and abnormal test subjects.

6. The method of claim 1, wherein the detected distinguishing features are anomalies present in the test subject.

7. The method of claim 1, wherein the second machine learning system outputs a result for the test subject of normal or abnormal.

8. The method of claim 1, wherein the input to the third machine learning system is the output of the first machine learning system.

9. The method of claim 1, wherein the third machine learning system is a Recurrent Neural Network, and wherein the Recurrent Neural Network is trained to interpret vector information provided as output by the first machine learning system.

10. A system for use in evaluating a test subject in computing environments, the system comprising a processor configured to:
    generate, by a first machine learning system, test subject features;
    analyze, by a second machine learning system, the test subject to detect distinguishing features of the test subject;
    perform, by a third machine learning system, natural language processing on the test subject features to create evaluation information associated with the test subject; and
    provide an evaluation of the test subject based on the distinguishing features and the evaluation information.

11. The system of claim 10, wherein the first machine learning system is a Convolutional Neural Network, and wherein the Convolutional Neural Network is trained using a plurality of images, wherein at least one of the plurality of images is translated into multiple representations of the at least one of the plurality of images, wherein the Convolutional Neural Network is trained with the multiple representations.

12. The system of claim 10, wherein the processor configured to generate, by the first machine learning system, test subject features, is further configured to:
    receive a plurality of images of the test subject, wherein the plurality of images comprise a plurality of representations of the test subject;
    create a three-dimensional view of the plurality of images; and
    receive, by the first machine learning system, the three-dimensional view as input.

13. The system of claim 12, wherein the input to the second machine learning system is the three-dimensional view.

14. The system of claim 10, wherein the second machine learning system is a Generative Adversarial Network, and wherein the Generative Adversarial Network is trained using training images comprising normal and abnormal test subjects.

15. The system of claim 10, wherein the detected distinguishing features are anomalies present in the test subject.

16. The system of claim 10, wherein the second machine learning system outputs a result for the test subject of normal or abnormal.

17. The system of claim 10, wherein the input to the third machine learning system is the output of the first machine learning system.

18. The system of claim 10, wherein the third machine learning system is a Recurrent Neural Network, and wherein the Recurrent Neural Network is trained to interpret vector information provided as output by the first machine learning system.

19. A computer program product for evaluating a test subject in computing environments, the computer program product comprising:
- a non-transitory computer readable storage medium having computer executable program code embodied therewith, the program code executable by a computer processor to:
  - generate, by a first machine learning system, test subject features;
  - analyze, by a second machine learning system, the test subject to detect distinguishing features of the test subject;
  - perform, by a third machine learning system, natural language processing on the test subject features to create evaluation information associated with the test subject; and
  - provide an evaluation of the test subject based on the distinguishing features and the evaluation information.

20. The computer program product of claim 19, wherein the first machine learning system is a Convolutional Neural Network, and wherein the Convolutional Neural Network is trained using a plurality of images, wherein at least one of the plurality of images is translated into multiple representations of the at least one of the plurality of images, wherein the Convolutional Neural Network is trained with the multiple representations.

* * * * *